(12) United States Patent
Stuart

(10) Patent No.: US 12,023,736 B2
(45) Date of Patent: Jul. 2, 2024

(54) METHOD OF ADDITIVE MANUFACTURING USING A ROTARY TABLE

(71) Applicant: AMERICAN AXLE & MANUFACTURING, INC., Detroit, MI (US)

(72) Inventor: Charles G. Stuart, Rochester Hills, MI (US)

(73) Assignee: AMERICAN AXLE & MANUFACTURING, INC., Detroit, MI (US)

(*) Notice: Subject to any disclaimer, the term of this patent is extended or adjusted under 35 U.S.C. 154(b) by 720 days.

(21) Appl. No.: 17/155,986

(22) Filed: Jan. 22, 2021

(65) Prior Publication Data

US 2021/0152062 A1    May 20, 2021

Related U.S. Application Data

(63) Continuation of application No. PCT/US2019/044264, filed on Jul. 31, 2019.

(51) Int. Cl.

| | |
|---|---|
| *B22F 3/00* | (2021.01) |
| *B22F 10/14* | (2021.01) |
| *B22F 10/47* | (2021.01) |
| *B22F 12/37* | (2021.01) |
| *B22F 12/52* | (2021.01) |
| *B22F 12/55* | (2021.01) |
| *B22F 12/63* | (2021.01) |
| *B33Y 10/00* | (2015.01) |
| *B33Y 30/00* | (2015.01) |

(Continued)

(52) U.S. Cl.
CPC .............. *B22F 3/003* (2013.01); *B22F 10/14* (2021.01); *B22F 10/47* (2021.01); *B22F 12/37* (2021.01); *B22F 12/52* (2021.01); *B22F 12/55* (2021.01); *B22F 12/63* (2021.01); *B33Y 10/00* (2014.12); *B33Y 30/00* (2014.12); *H02K 1/20* (2013.01); *H02K 15/03* (2013.01); *B33Y 80/00* (2014.12)

(58) Field of Classification Search
CPC ......... B22F 10/14; B33Y 10/00; B33Y 30/00; B33Y 80/00; H02K 15/03
See application file for complete search history.

(56) References Cited

U.S. PATENT DOCUMENTS

| | | | |
|---|---|---|---|
| 9,419,502 B2 | 8/2016 | Veronesi et al. | |
| 9,623,607 B2 * | 4/2017 | Uzan | ..................... B29C 64/209 |

(Continued)

FOREIGN PATENT DOCUMENTS

| | | | | |
|---|---|---|---|---|
| CN | 109648844 A | * | 4/2019 | |
| CN | 111926328 A | * | 11/2020 | ............. B33Y 10/00 |

(Continued)

OTHER PUBLICATIONS

Chivel, Yuri; "New approach to multi-material processing in selective laser melting"; Physics Procedia; vol. 83; 2016; pp. 891-898 (8 pages).

(Continued)

*Primary Examiner* — Jeffrey T Carley
(74) *Attorney, Agent, or Firm* — Reising Ethington P.C.

(57) ABSTRACT

A method for manufacturing in which alternating layers of a powdered magnetically susceptible material and a powdered insulating material are deposited onto a table as it is rotated about a first rotational axis.

6 Claims, 5 Drawing Sheets

(51) Int. Cl.
  *H02K 1/20* (2006.01)
  *H02K 15/03* (2006.01)
  *B33Y 80/00* (2015.01)

(56) References Cited

U.S. PATENT DOCUMENTS

| | | | | |
|---|---|---|---|---|
| 10,141,804 | B2* | 11/2018 | Schuler | H02K 21/24 |
| 11,007,713 | B2* | 5/2021 | Spicer | B29C 64/171 |
| 11,155,036 | B2* | 10/2021 | Mathea | B33Y 30/00 |
| 2003/0192169 | A1* | 10/2003 | Reiter, Jr. | H02K 15/03 29/608 |
| 2004/0265413 | A1* | 12/2004 | Russell | B41J 29/17 425/375 |
| 2014/0035423 | A1* | 2/2014 | Veronesi | B33Y 10/00 156/60 |
| 2014/0265034 | A1* | 9/2014 | Dudley | B33Y 30/00 264/401 |
| 2017/0008084 | A1 | 1/2017 | Witney et al. | |
| 2017/0155309 | A1* | 6/2017 | Jassal | B23K 26/702 |
| 2017/0173886 | A1* | 6/2017 | Menchik | B33Y 30/00 |
| 2018/0085995 | A1* | 3/2018 | Davis | B33Y 50/02 |
| 2018/0154437 | A1* | 6/2018 | Mark | B22F 1/142 |
| 2019/0168448 | A1* | 6/2019 | Osiroff | B29C 64/40 |
| 2020/0353684 | A1* | 11/2020 | Dudley | B29C 64/124 |

FOREIGN PATENT DOCUMENTS

| | | | | |
|---|---|---|---|---|
| DE | 102016119650 | A1 | 4/2018 | |
| DE | 102020001068 | A1* | 8/2021 | B29C 64/112 |
| JP | 2017073865 | A | 4/2017 | |
| JP | 2017204980 | A | 11/2017 | |
| WO | WO-2017087375 | A1 | 5/2017 | |

OTHER PUBLICATIONS

Emetor AB; "Lamination thickness"; https://www.emetor.com/glossary/lamination-thickness/ (1 page).

Fejes, Matthias; "Premiere at Hannover Messe: Fully 3D-Printed Electric Motors"; Technische Universitat Chemnitz; Apr. 17, 2018; https://www.tu-chemnitz.de/tu/pressestelle/aktuell/8718/en (1 page).

Laumer, Tobias et al.; "Laser beam melting of multi-material components"; Physics Procedia; vol. 39; 2012; pp. 518-525 (8 pages).

Materials Today; "Laser tech creates aluminium oxide layer"; Mar. 21, 2014; https://www.materialstoday.com/additive-manufacturing/news/laser-tech-creates-aluminium-oxide-layer/ (1 page).

Mohanty, Sankhya and Hattel, Jesper Henri; "Laser additive manufacturing of multimaterial tool inserts: a simulation-based optimization study"; Proc. SPIE 10095, Laser 3D Manufacturing IV, 100950G; Feb. 24, 2017 (10 pages).

International Search Report and Written Opinion for International Application PCT/US2019/044264, mailed Oct. 1, 2019.

Chinese Office Action for Chinese Application No. 201980065128.7 dated Apr. 9, 2024 (10 pages).

English Translation of Chinese Office Action for Chinese Application No. 201980065128.7 dated Apr. 9, 2024 (8 pages).

* cited by examiner

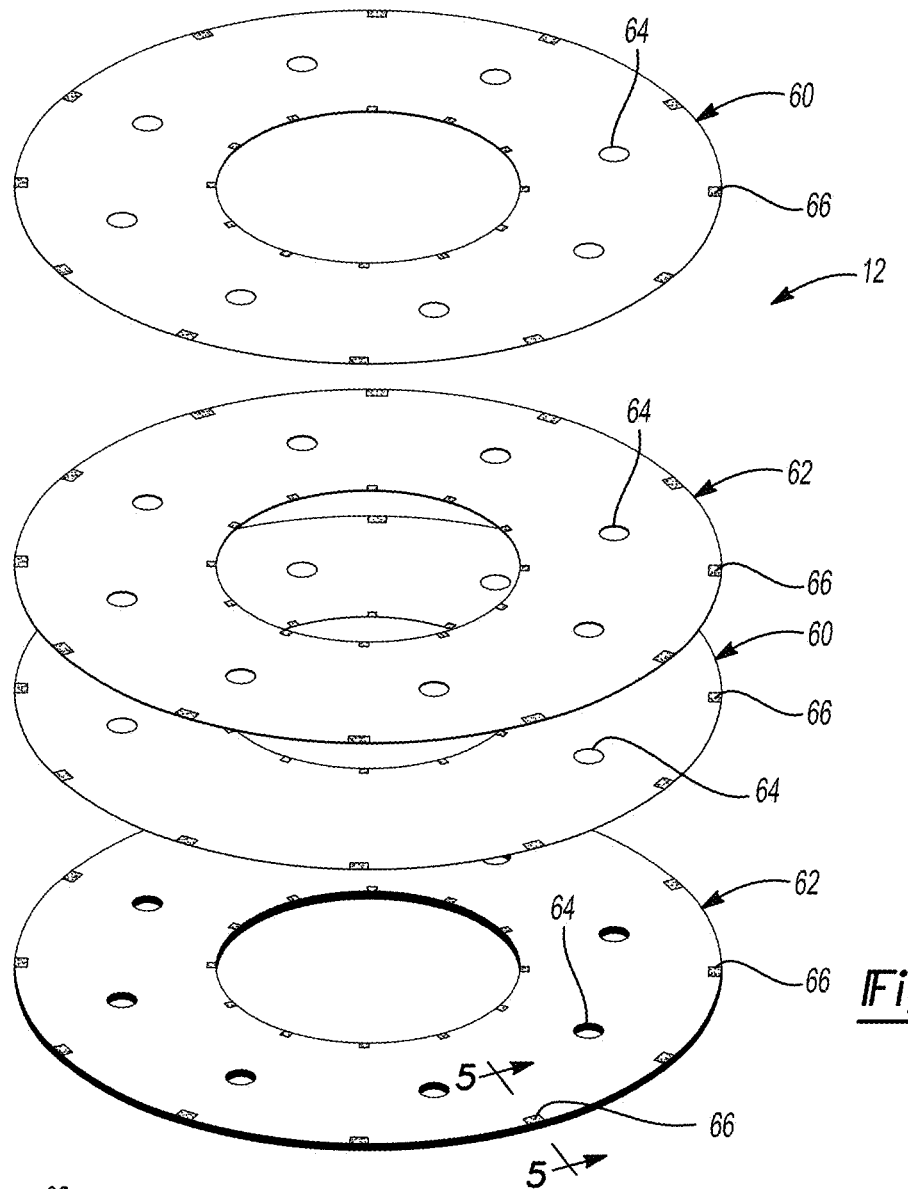
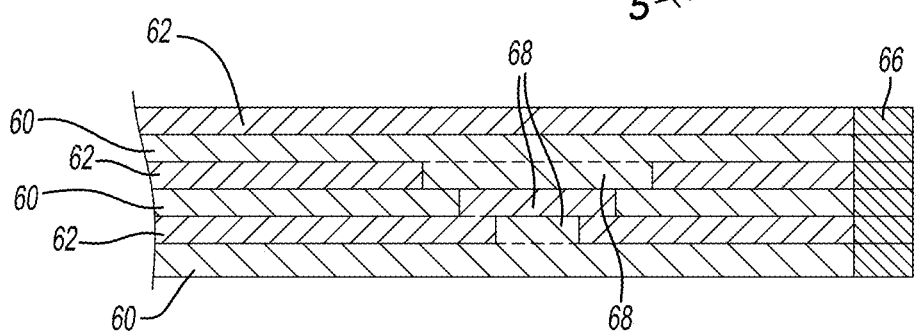
Fig-4
Fig-5

METHOD OF ADDITIVE MANUFACTURING USING A ROTARY TABLE

CROSS-REFERENCE TO RELATED APPLICATIONS

This application is a (bypass) continuation of International Patent Application No. PCT/US2019/044264 filed Jul. 31, 2019, which claims priority to U.S. patent application Ser. No. 16/053,080, filed on Aug. 2, 2018. The entire disclosure of each of the above-referenced applications is incorporated herein by reference.

FIELD

The present disclosure relates to a system and method for additive manufacturing, and particularly, for additive manufacturing of stators.

BACKGROUND

This section provides background information related to the present disclosure and is not necessarily prior art.

Stators for electric motors can include lamination stacks having alternating layers of magnetically susceptible layers and insulating layers. The insulating layers reduce eddy current losses in the stator. Reducing the thicknesses of the layers can further reduce eddy current losses. There is a limit, however, to how thin the layers can be made by conventional methods. If the layers are made too thin, conventional manufacturing processes become unreliable and the layers become too fragile to handle and process. The present disclosure provides a system and method for manufacturing laminated stators (or other laminated components) that allow each individual layer to be formed very thin while also allowing for a variety of features to be formed on or in the stator.

SUMMARY

This section provides a general summary of the disclosure, and is not a comprehensive disclosure of its full scope or all of its features.

In one form, the present disclosure provides a system that may include a table, a supporting structure, a first powder dispenser, and a second powder dispenser. The table may be rotatable about a first rotational axis. The supporting structure may be mounted for movement relative to the table. The first powder dispenser may be mounted to the supporting structure and may extend radially across the table. The first powder dispenser may include a first outlet disposed vertically above the table. The second powder dispenser may be mounted to the supporting structure and may extend radially across the table. The second powder dispenser may include a second outlet disposed vertically above the table. The table may be rotatable about the first rotational axis relative to the supporting structure and the first and second powder dispensers. The first and second powder dispensers may be movable with the supporting structure relative to the table in a direction parallel to the first rotational axis.

In some configurations, the system may include a binder dispenser mounted to the supporting structure and extending radially across the table, the binder dispenser having a third outlet disposed vertically above the table. The binder dispenser may be circumferentially spaced apart from the first and second powder dispensers. The binder dispenser may be movable with the supporting structure relative to the table in the direction parallel to the first rotational axis.

In some configurations, the system of one or both of the above paragraphs may include a compacting roller mounted to the supporting structure and disposed vertically above the table. The compacting roller may be rotatable relative to the supporting structure and the table about a second rotational axis that is angled relative to the first rotational axis.

In some configurations of the system of one or more of the above paragraphs, the compacting roller includes a frusto-conical rolling surface.

In some configurations of the system of one or more of the above paragraphs, the compacting roller is disposed circumferentially between the second powder dispenser and the binder dispenser.

In some configurations, the system of one or more of the above paragraphs may include a curing element attached to the supporting structure and extending radially across the table. The curing element may be disposed vertically above the table. The binder dispenser may be disposed circumferentially between the curing element and the second powder dispenser.

In some configurations, the system of one or more of the above paragraphs may include a third powder dispenser mounted to the supporting structure and extending radially across the table. The third powder dispenser may include a fourth outlet disposed vertically above the table. The third powder dispenser may be circumferentially spaced apart from the first and second powder dispensers. The third powder dispenser may be movable with the supporting structure relative to the table in the direction parallel to the first rotational axis.

In some configurations of the system of one or more of the above paragraphs, the first and second powder dispensers are rotationally fixed relative to the first rotational axis.

In another form, the present disclosure provides a system that may include a table, a first powder dispenser, a second powder dispenser, and a binder dispenser. The table may be rotatable about a first rotational axis. The first powder dispenser may extend radially across the table. The first powder dispenser may include a first outlet disposed vertically above the table. The second powder dispenser may extend radially across the table. The second powder dispenser may include a second outlet disposed vertically above the table. The binder dispenser may extend radially across the table. The binder dispenser may include a third outlet disposed vertically above the table. The binder dispenser may be circumferentially spaced apart from the first and second powder dispensers. The table may be rotatable about the first rotational axis relative to the first and second powder dispensers and the binder dispenser. The first and second powder dispensers and the binder dispenser may be movable relative to the table in a direction parallel to the first rotational axis. The first and second powder dispensers and the binder dispenser may be rotationally fixed relative to each other.

In some configurations, the system of one or more of the above paragraphs may include a supporting structure supporting the first and second powder dispensers and the binder dispenser and movable with the first and second powder dispensers and the binder dispenser in the direction parallel to the first rotational axis.

In some configurations, the system of one or more of the above paragraphs may include a compacting roller mounted to the supporting structure and extending radially across the table from the supporting structure. The compacting roller may be disposed vertically above the table. The compacting roller may be rotatable relative to the supporting structure and the table about a second rotational axis that is angled relative to the first rotational axis.

In some configurations of the system of one or more of the above paragraphs, the second rotational axis is disposed at a non-perpendicular angle relative to the first rotational axis.

In some configurations of the system of one or more of the above paragraphs, the supporting structure is disposed radially inward relative to an inner diameter of the table. The first and second powder dispensers, the binder dispenser and the compacting roller may extend radially outward from the supporting structure.

In some configurations of the system of one or more of the above paragraphs, the compacting roller includes a frustoconical rolling surface.

In some configurations of the system of one or more of the above paragraphs, the compacting roller is disposed circumferentially between the second powder dispenser and the binder dispenser.

In some configurations, the system of one or more of the above paragraphs may include a curing element extending radially across the table. The curing element may be disposed vertically above the table. The binder dispenser may be disposed circumferentially between the curing element and the second powder dispenser.

In some configurations, the system of one or more of the above paragraphs may include a third powder dispenser extending radially across the table. The third powder dispenser may include a fourth outlet disposed vertically above the table. The third powder dispenser may be circumferentially spaced apart from the first and second powder dispensers and the binder dispenser. The third powder dispenser may be movable with the first and second powder dispensers and the binder dispenser relative to the table in the direction parallel to the first rotational axis.

In another form, the present disclosure provides a manufacturing method that may include: rotating a table about a first rotational axis; dispensing a powdered magnetically susceptible material onto the table while the table is rotating; dispensing a powdered insulating material onto the table while the table is rotating; dispensing a binder material onto the table while the table is rotating; forming a plurality of first layers of the magnetically susceptible material on the table; and forming a plurality of second layers of the insulating material on the table, wherein each of the second layers is disposed axially between adjacent first layers.

In some configurations, the method may include removing the first and second layers from the table and subsequently heating the first and second layers in an oven.

In some configurations of the method of one or more of the above paragraphs, the first and second layers are discrete layers.

In some configurations of the method of one or more of the above paragraphs, the first and second layers cooperate to form a single, continuous helical coil.

In some configurations, the method of one or more of the above paragraphs may include: compacting the powdered magnetically susceptible material on the table using a compacting roller; and curing the binder material after compacting the powdered magnetically susceptible material.

In some configurations, the method of one or more of the above paragraphs may include forming apertures in the first and second layers by ceasing dispensation of the powdered magnetically susceptible material and the powdered insulating material at selected locations radially between inner and outer diameters of the first and second layers.

In some configurations, the method of one or more of the above paragraphs may include forming an electrically conductive path through the plurality of first and second layers by dispensing powdered conductive material at selected locations on each of the first and second layers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a partially exploded view of the stator;

FIG. 5 is a partial cross-sectional view of the stator taken at line 5-5 of FIG. 4;

Corresponding reference numerals indicate corresponding parts throughout the several views of the drawings.

DETAILED DESCRIPTION

Example embodiments will now be described more fully with reference to the accompanying drawings.

Figure 1:
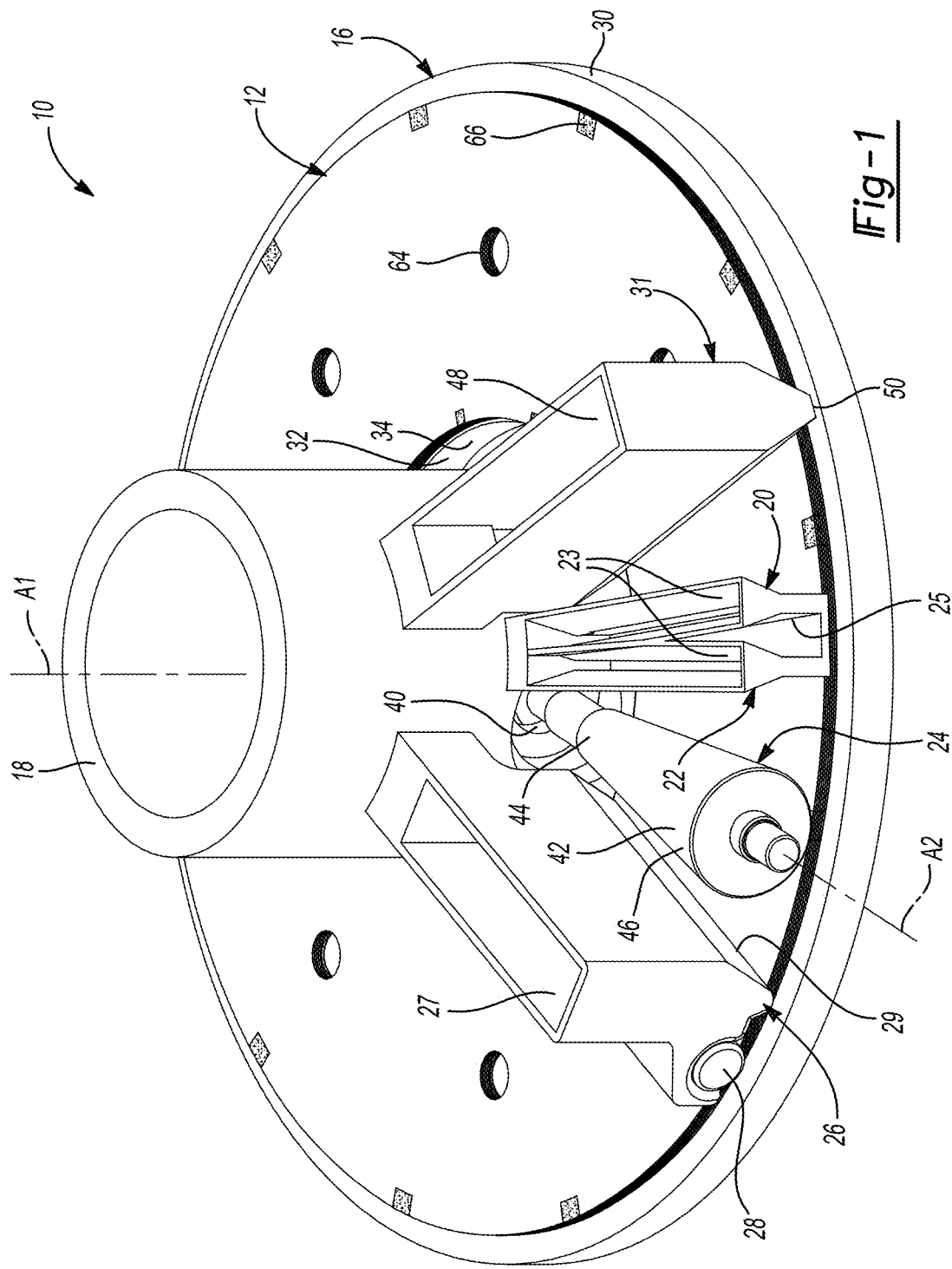
FIG. 1 is a perspective view of an additive manufacturing system and layers of a stator being manufactured by the system.
Figure 2:
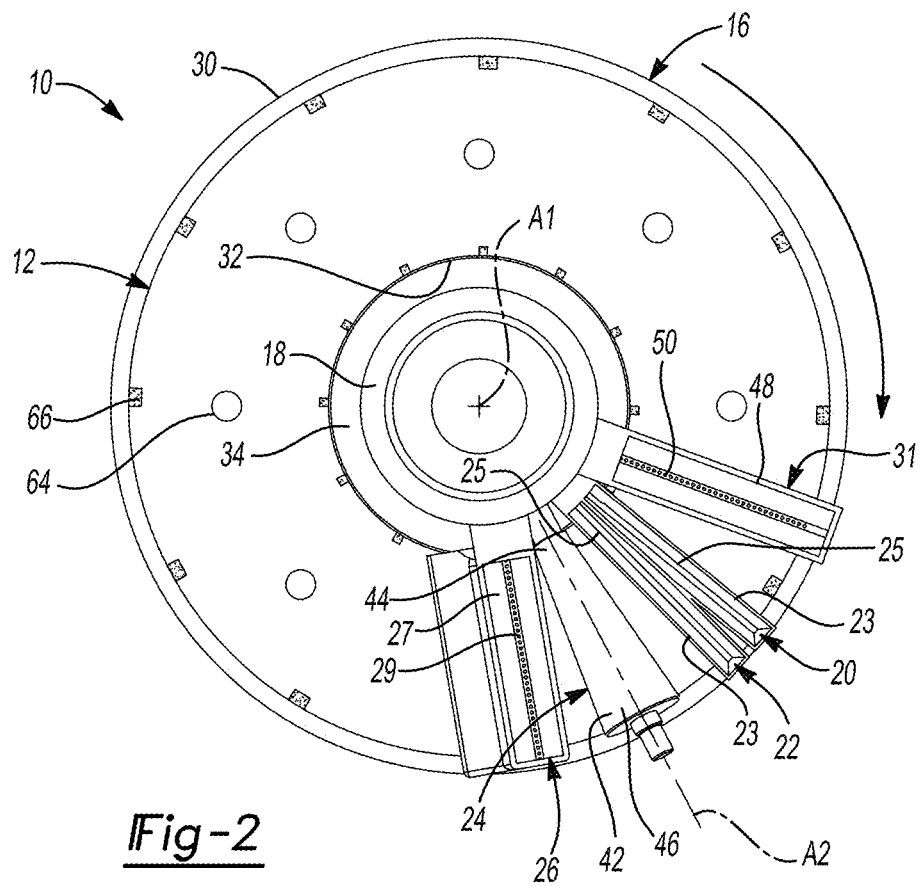
FIG. 2 is an overhead view of the system and stator.
Figure 3:
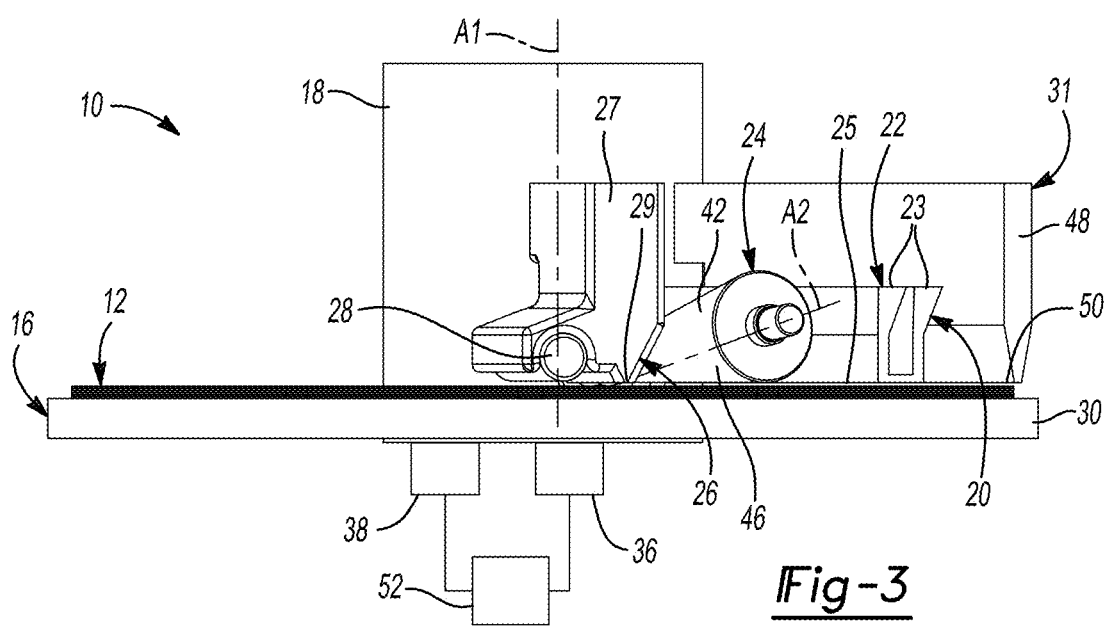
FIG. 3 is a side view of the system and stator.
Figure 7:
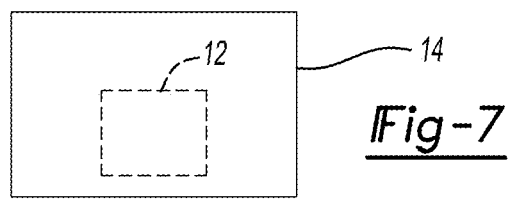
FIG. 7 is a schematic representation of the stator inside of an oven.

With reference to FIGS. 1-3, an additive manufacturing system 10 is provided that can form a layered or laminated object such as a stator 12 of an electrical motor or a core of a transformer, for example. The system 10 can form and bond alternating laminations of different materials. To manufacture the stator 12 shown in FIGS. 1-5, the system 10 can form and bond alternating laminations of a magnetically susceptible material (e.g., powdered steel) and an insulating material (e.g., powdered silica and/or nylon). Thereafter, the laminated stator 12 can be heated or sintered in an oven or furnace 14 (shown schematically in FIG. 7) to coalesce the powdered materials.

As shown in FIGS. 1-3, the system 10 may include a rotating table 16, a supporting column (i.e., a supporting structure) 18, a first powder material dispenser 20, a second powder material dispenser 22, a compacting roller 24, a binder dispenser 26, and a curing element 28. In some embodiments, the system 10 may include a third powder material dispenser 31.

The rotating table 16 can be a disk-shaped platen having an outer diameter 30 and an inner diameter 32. The inner diameter 32 defines a central aperture 34. The table 16 may be mounted to a stationary base or a frame (not shown). A first actuator 36 (e.g., an electric motor; shown schematically in FIG. 3) may be coupled to the table 16 and is operable to rotate the table 16 about a first rotational axis A1 relative to the supporting column 18, the dispensers 20, 22, 26, 31, the compacting roller 24, and the curing element 28. In the particular example shown in figures, the first actuator 36 rotates the table 16 in a clockwise rotational direction viewed from the frame of reference of FIG. 2.

The supporting column 18 may support the dispensers 20, 22, 26, 31, the compacting roller 24 and the curing element 28 above the table 16. The supporting column 18 may be mounted to a stationary base or a frame (e.g., the same base or frame to which the table 16 is mounted or a different frame or base). The supporting column 18 may be disposed radially inward relative to the inner diameter 32 of the table 16. The supporting column 18 may extend vertically along the first rotational axis A1 of the table 16. In the particular example shown in the figures, the supporting column 18 has a cylindrical shape. In other embodiments, the supporting column 18 may have any other suitable shape. As shown schematically in FIG. 3, a second actuator 38 (e.g., an electric motor or a hydraulic or pneumatic actuator) may be coupled to the supporting column 18 and may drive the supporting column 18 (as well as the dispensers 20, 22, 26, 31, the compacting roller 24, and the curing element 28 attached to the supporting column 18) relative to the table 16 in a direction along or parallel to the first rotational axis A1. In some configurations, one column 18 or a plurality of columns 18 can be attached to a platen that is movable along the first rotational axis A1.

The first and second dispensers 20, 22 may be fixedly attached to the supporting column 18 and may extend radially outward from the supporting column 18 and across the table 16 (i.e., across the outer and inner diameters 30, 32 of the table 16). The table 16 rotates beneath the first and second dispensers 20, 22. The first and second dispensers 20, 22 can be any suitable type of powder material dispensers, such as ultrasonic dispensers, for example. The first dispenser 20 may dispense the magnetically susceptible material, and the second dispenser 22 may dispense the insulating material. Each of the first and second dispensers 20, 22 may include a material reservoir 23 (that receives powder material from a source of powder material) and one or more nozzles or one or more outlets 25 through which the powder material can be dispensed onto the table 16 as the table 16 rotates. The first and second dispensers 20, 22 can selectively dispense a desired amount of their respective materials at any one or more radial locations along the radial extent of the table 16 between the outer and inner diameters 30, 32 of the table 16.

The compacting roller 24 smooths and compacts powder material dispensed onto the table 16 from the dispensers 20, 22. The compacting roller 24 may be attached to the supporting column 18 and may extend radially outward from the supporting column 18 and across the table 16 (i.e., across the outer and inner diameters 30, 32 of the table 16). The table 16 rotates beneath the compacting roller 24. The compacting roller 24 is circumferentially spaced apart from the first and second dispensers 20, 22. A bearing 40 (FIG. 1) mounted to the supporting column 18 may support the compacting roller 24 for rotation about a second rotational axis A2. The second rotational axis A2 is disposed at an angle (e.g., a non-zero, non-perpendicular angle) relative to the first rotational axis A1 of the table 16.

The compacting roller 24 includes a rolling surface 42 that can rollingly contact the stator 12 on the table 16. The rolling surface 42 may have a frustoconical shape including a first end 44 and a second end 46. The first end 44 may be disposed at or near the inner diameter 32 of the table 16. The second end 46 may be disposed at or near the outer diameter 30 of the table 16. The diameter of the rolling surface 42 increases as the rolling surface 42 extends axially from the first end 44 to the second end 46. This variation of the diameter of the rolling surface 42 allows the linear velocity of the rolling surface 42 (relative to the rotating table 16) to be equal at every location along the axial length of the rolling surface 42. This allows the compacting roller 24 to compact and smooth the powder material equally at all radial positions of the table 16 between the outer and inner and outer diameters 30, 32.

The binder dispenser 26 may be fixedly attached to the supporting column 18 and may extend radially outward from the supporting column 18 and across the table 16 (i.e., across the outer and inner diameters 30, 32 of the table 16). The table 16 rotates beneath the binder dispenser 26. The binder dispenser 26 may be circumferentially spaced apart from the compacting roller 24 such that the compacting roller 24 is disposed circumferentially between the binder dispenser 26 and the first and second dispensers 20, 22 (i.e., powder material dispensed onto the table 16 by the first or second dispenser 20, 22 is compacted and smoothed by the compacting roller 24 before passing beneath the binder dispenser 26).

The binder dispenser 26 can be any suitable type of dispenser (e.g., a binder jet). The binder dispenser 26 may dispense a binder material (e.g., an adhesive) onto powder material that has been dispensed onto the table 16 by the dispensers 20, 22 and smoothed and compacted by the compacting roller 24. The binder dispenser 26 may include a material reservoir 27 (that receives the binder material from a source of binder material) and one or more nozzles or one or more outlets 29 through which the binder material can be dispensed onto the table 16 as the table 16 rotates. The binder dispenser 26 can selectively dispense a desired amount of the binder material at any one or more radial locations along the radial extent of the table 16 between the outer and inner diameters 30, 32 of the table 16.

The curing element 28 may extend radially across the table 16 (e.g., across the outer and inner diameters 30, 32 of the table 16). The curing element 28 may be a heat source (e.g., an electric resistance heater with heating coils, a flame source, a laser, a heated roller, etc.) or an ultraviolet (UV) light source, for example. The curing element 28 may be circumferentially spaced apart from the binder dispenser 26 such that the binder dispenser 26 is disposed circumferentially between the compacting roller 24 and the curing element 28 (i.e., binder material dispensed onto the table 16 by the binder dispenser 26 passes beneath the curing element 28). The curing element 28 may at least partially cure the binder material to bind the particles of powder material to each other.

The third powder material dispenser 31 may be fixedly attached to the supporting column 18 and may extend radially outward from the supporting column 18 and across the table 16 (i.e., across the outer and inner diameters 30, 32 of the table 16). The table 16 rotates beneath the third dispenser 31. The third dispenser 31 can be any suitable type of powder material dispenser, such as an ultrasonic dispenser, for example. The third dispenser 31 may dispense an electrically conductive material (e.g., copper). The third dispenser 31 may include a material reservoir 48 (that receives powder material from a source of powder material) and one or more nozzles or one or more outlets 50 through which the powder material can be dispensed onto the table 16 as the table 16 rotates. The third dispenser 31 can selectively dispense a desired amount of powder material at any one or more radial locations along the radial extent of the table 16 between the outer and inner diameters 30, 32 of the table 16.

A control module 52 (shown schematically in FIG. 3) may be in communication with the first and second actuators 36, 38, the dispensers 20, 22, 26, 31 and the curing element 28. The control module 52 may control operation of the first and second actuators 36, 38 to move the table 16 and supporting column 18, respectively, as desired. The control module 52 may also control operation of the dispensers 20, 22, 26, 31 and the curing element 28 to dispense, bond and cure the desired materials in the desired locations. The control module 52 may include processing circuitry configured to execute instructions stored on at least one non-transitory, tangible computer-readable medium.

In some configurations, an actuator (not shown) can drive rotation of the compacting roller 24 (e.g., rotation about the second rotational axis A2). The control module 52 could control operation of such an actuator to drive the compacting roller 24 in desired directions and at desired speeds. In other configurations, the compacting roller 24 could be driven by the first actuator 36 (e.g., via a linkage, gears, etc. coupling the compacting roller 24 to the table 16 or directly to first actuator 36). In other configurations, friction between the rolling surface 42 of the compacting roller 24 and the stator 12 on the table 16 may drive rotation of the compacting roller 24.

Referring now to FIGS. 1-7, a method of manufacturing the stator 12 using the system 10 will be described. As described above, the system 10 can form and bond alternating laminations of the magnetically susceptible material and the insulating material. Thereafter, the laminated stator 12 can be heated or sintered in the oven 14 (FIG. 7) to coalesce the powdered materials.

As shown in FIGS. 4 and 5, the stator 12 manufactured using the method of the present disclosure includes a plurality of discrete first layers or laminations 60 and a plurality of discrete second layers or laminations 62. The first layers 60 may be formed from the magnetically susceptible material, and the second layers 62 may be formed from the insulating material.

To form one of the first layers 60, the control module 52 may operate the first actuator 36 to rotate the table 16 and operate the first powder material dispenser 20 to dispense powdered magnetically susceptible material onto the table 16 while the table 16 is rotating. The control module 52 can control the first powder material dispenser 20 to dispense appropriate amounts of the powder material at desired radial locations on the table 16 to form a desired thickness of material.

While the table 16 is rotating, the compacting roller 24 compacts and smooths the powder material after the powder material is dispensed from the first powder material dispenser 20, as described above. Thereafter, the compacted powder material passes beneath the binder dispenser 26, and binder material can be dispensed onto the compacted powder material. Thereafter, the binder material and powder material pass beneath the curing element 28, which at least partially cures the binder material to bond the particles of powder material to each other. The table 16 may continue to rotate and the first powder material dispenser 20 and the binder dispenser 26 may continue dispensing in this manner to form a discrete layer 60.

After a complete (360 degree) rotation of the table 16, one layer 60 is formed. Then, to form a second layer 62 on top of the first layer 60, the above steps may be repeated with the second powder material dispenser 22 dispensing the powdered insulating material instead of the first powder material dispenser 20 dispensing the magnetically susceptible material. Another complete (360 degree) rotation of the table 16 with the second powder material dispenser 22 dispensing the insulating material will form one of the second layers 62. Thereafter, the supporting column 18 is moved vertically upward again, and another layer 60 can be formed in the manner described above. The above steps can be repeated as many times as desired to form as many alternating layers 60, 62 as desired.

If desired, each of the layers 60, 62 can include one or more of a variety of different features. For example, as shown in FIG. 4, each of the layers 60, 62 could include a plurality of apertures 64 and/or a plurality of conductors 66. The apertures 64 can be formed by ceasing the dispensation of powder material from the dispenser 20, 22 only at the locations at which the apertures 64 are desired to be formed while continuing to dispense powder material from the dispenser 20, 22 around the locations at which the apertures 64 are desired to be formed. The conductors 66 can be formed by ceasing dispensation of powder material from the dispenser 20, 22 at the desired location for the conductor 66 and instead dispensing powdered electrically conductive material from third dispenser 31 at the desired location.

As shown in FIG. 1, when multiple layers 60, 62 are stacked upon each other, selected ones of the apertures 64 in the layers 60, 62 can be aligned with each other to form internal passages (e.g., coolant passages, air passages, bolt holes, etc.) in the stator 12. Similarly, selected ones of the conductors 66 in the layers 60, 62 can be aligned with each other to form larger conductors (e.g., an electrically conductive path) that could (optionally) extend though the axial length of the stator 12 and could replace conventional wires or windings, for example.

As shown in FIG. 5, one of more of the layers 60, 62 could include one or more step features (or out-of-plane features) 68. For example, one or more of the first layers 60 could include one or more step features 68 (formed from the same material as the rest of the first layer 60) disposed in the same plane as an adjacent second layer 62; and one or more of the second layers 62 could include one or more step features 68 (formed from the same material as the rest of the second layer 62) disposed in the same plane as an adjacent first layer 60.

Step features 68 in one of the first layers 60 can be formed during the formation of an adjacent second layer 62 by ceasing dispensation of powder material from the second dispenser 22 at the desired location for the step feature 68 and instead dispensing powder material from first dispenser 20 at the desired location. Similarly, step features 68 in one of the second layers 62 can be formed during the formation of an adjacent first layer 60 by ceasing dispensation of powder material from the first dispenser 20 at the desired location for the step feature 68 and instead dispensing powder material from second dispenser 22 at the desired location.

It will be appreciated that a variety of other features could be formed in one or more layers 60, 62. For example, attachment features, splines, and/or other shapes could be formed into any of the layers 60, 62. Furthermore, one or more layers 60, 62 of a given stator 12 could have thicknesses that vary and/or thicknesses that differ from the thicknesses of other layers 60, 62 of the same stator 12.

Figure 6:
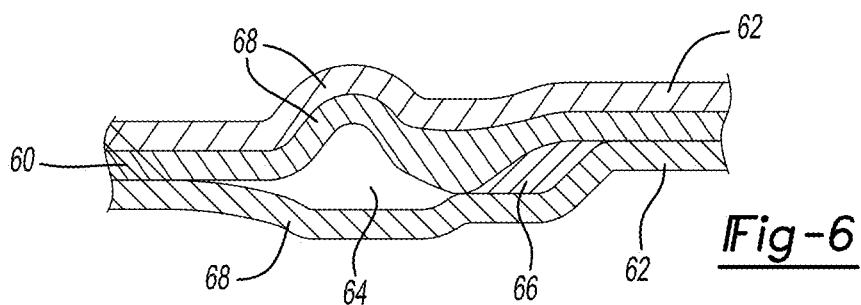
FIG. 6 is a partial cross-sectional view of another example stator.

FIG. 6 depicts another example of layers 60, 62 having step features or out-of-plane features 68 that form an aperture 64 between adjacent layers 60, 62 and with a conductor 66 between adjacent layers 60, 62. It will be appreciated that step features 68 can be formed in any desired shape to produce desired features in or on the stator 12. Some of the out-of-plane features 68 may be supported by un-bonded powder during the deposition of the material forming the out-of-plane features 68. After the material forming the out-of-plane features 68 is bonded, the un-bonded supporting powder can be removed.

Once a desired number of layers 60, 62 are formed using the steps above, the resultant stator 12 may be heated or sintered in the oven 14 (shown in FIG. 7) to coalesce the powdered materials and bond the layers 60, 62 to each other. During the heating or sintering process, some step features or out-of-plane features 68 may be support by a ceramic fixture, for example, or any other suitable fixture. Thereafter, the stator 12 can be removed from the fixture.

Figure 8:
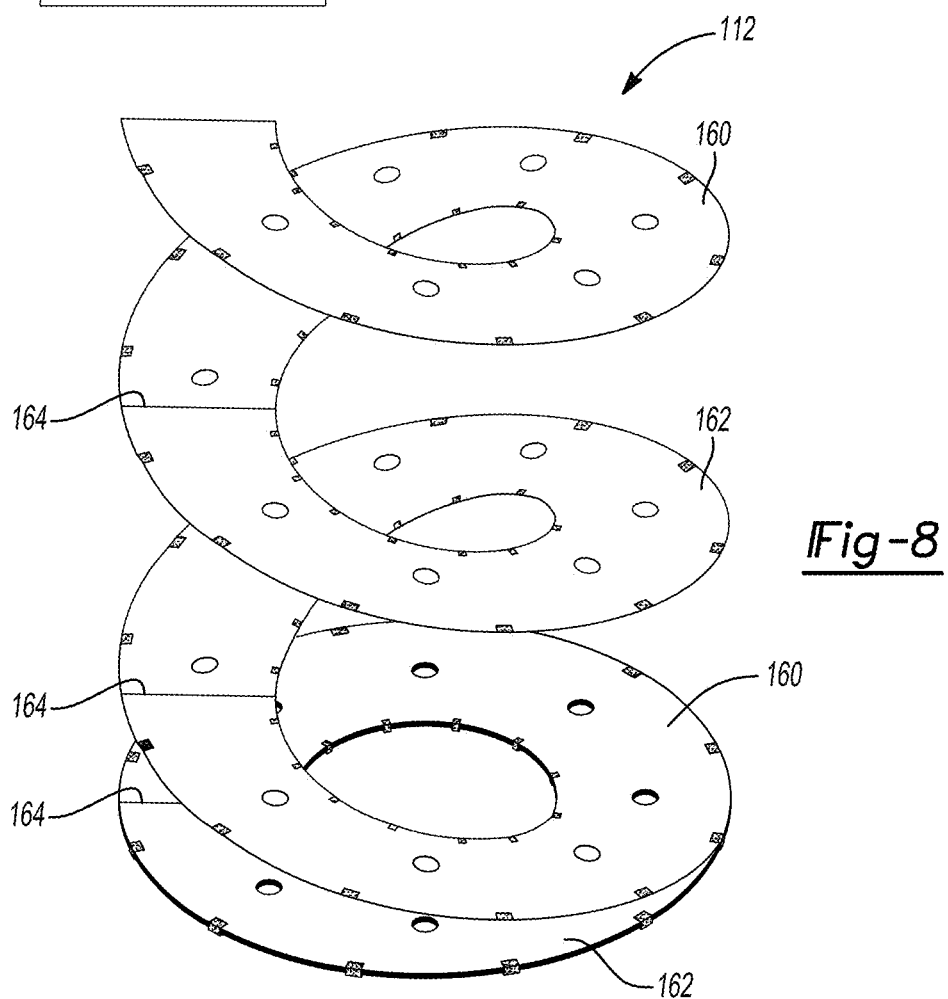
FIG. 8 is a partially exploded view of an alternative stator that can be manufactured by the system.

Referring now to FIG. 8, an alternative stator 112 is provided that could be formed using the system 10 described above. Like the stator 12, the stator 112 can have alternating layers 160, 162 (similar to the layers 60, 62, respectively). That is, each layer 160 is disposed axially between adjacent layers 162. The layers 160, 162 can be formed from the same or similar materials as the layers 60, 62, respectively, and can be formed with the same or similar features (e.g., apertures 64, conductors 66 and/or step features 68) as the layers 60, 62 of the stator 12. The stator 112 can be similar to the stator 12, except the layers 160, 162 of the stator 112 form a single, continuous helical coil instead of the discrete layers 60, 62 of the stator 12. Each layer 160, 162 is a segment of the continuous helical coil. Seams 164 between adjacent layers 160, 162 could be circumferentially aligned with each other or circumferentially staggered apart from each other.

The single, continuous helical coil of the layers 160, 162 can be formed by continuously raising the supporting column 18 during the entire 360 degrees of rotation of the table 16, rather than raising the supporting column 18 in discrete steps at the conclusion of each 360 degree rotation of the table 16. As with the formation of the layers 60, 62 of the stator 12, the layers 160 of the stator 112 may be formed by dispensing powder material from the first powder dispenser 20, and the layers 162 of the stator 112 may be formed by dispensing powder from the second dispenser 22, as described above.

Like the stator 12, once a desired number of layers 160, 162 are formed using the steps above, the resultant stator 112 may be heated or sintered in the oven 14.

Figure 9:
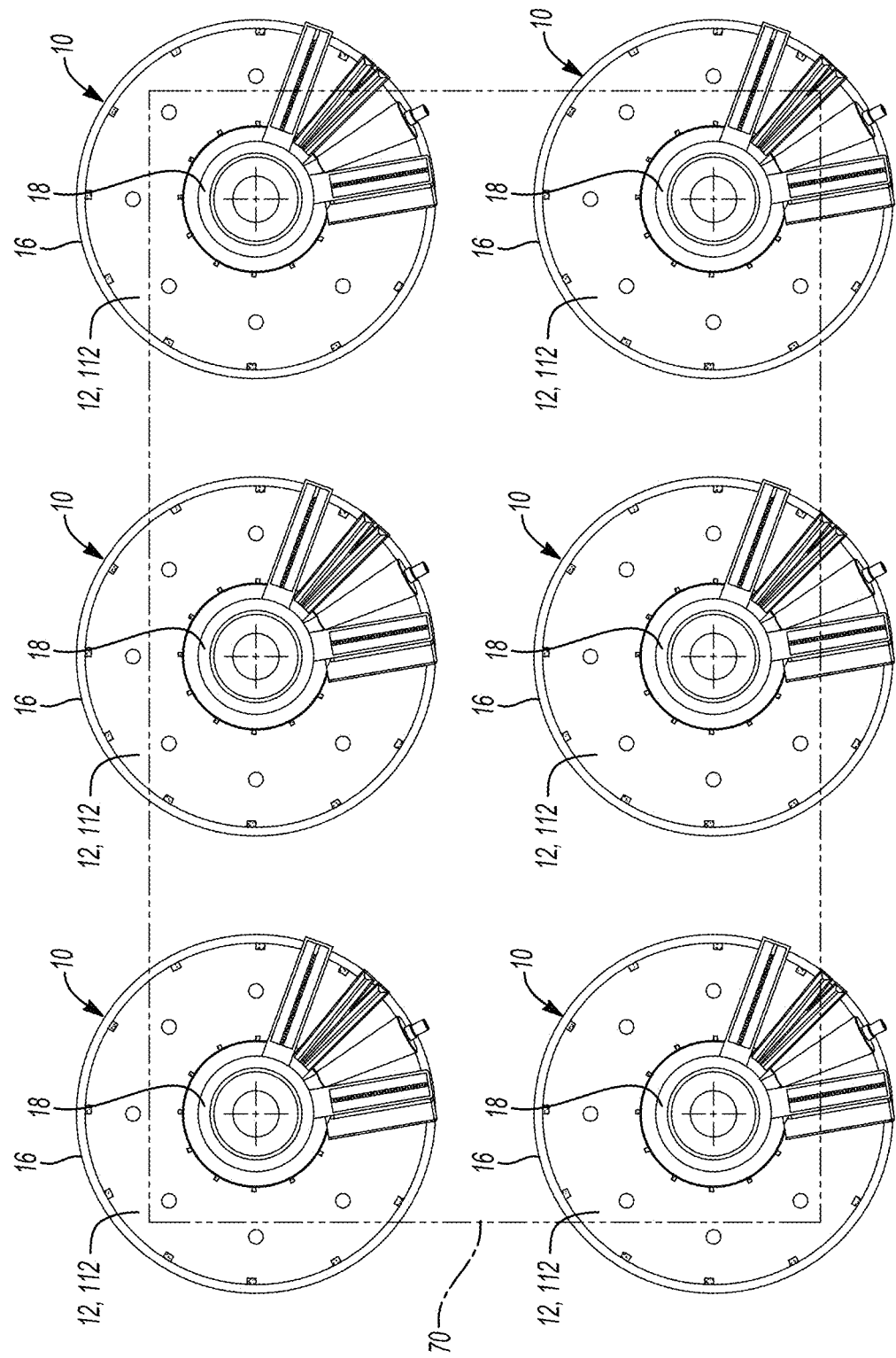
FIG. 9 is an overhead view of a plurality of the systems attached to each other by a common platen.

Referring now to FIG. 9, a plurality of systems 10 could be operated simultaneously to form a plurality of stators 12 (or a plurality of stators 112) simultaneously. For example, the supporting column 18 of each of the systems 10 could be mounted to a common platen 70 (shown schematically in FIG. 9) or any other suitable structure. A single actuator (not shown) could move the platen 70 to simultaneously move all of the supporting columns 18 relative to the tables 16.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A manufacturing method comprising:
   rotating a table about a rotational axis;
   forming a stack from a plurality of laminations, each of the plurality of laminations having an annular shape and being stacked along the rotational axis, each of the plurality of laminations being formed by:
   depositing a powdered magnetically susceptible material onto the table while the table is rotating to form a magnetically susceptible layer;
   depositing a binder material onto the magnetically susceptible layer while the table is rotating; and
   depositing a powdered insulating material over the binder material that is deposited onto the magnetically susceptible layer while the table is rotating to form an insulating layer;
   wherein the laminations are disposed in the stack such that the insulating layer of one lamination is abutted against the magnetically susceptible layer of an adjacent lamination.

2. The method of claim 1, further comprising heating the stack in an oven.

3. The method of claim 1, wherein the magnetically susceptible layer and the insulating layer are discrete layers.

4. The method of claim 1, further comprising:
   compacting the magnetically susceptible layer on the table with a compacting roller; and
   curing the binder material after compacting the powdered magnetically susceptible material.

5. The method of claim 1, further comprising forming apertures in each of the laminations by interrupting the depositing of the powdered magnetically susceptible material and the powdered insulating material at selected locations radially between inner and outer diameters of the laminations.

6. The method of claim 1, further comprising forming an electrically conductive path through the laminations by depositing a powdered conductive material at selected locations during the formation of each of the laminations.

* * * * *